(12) United States Patent
Rolia et al.

(10) Patent No.: US 8,448,181 B2
(45) Date of Patent: *May 21, 2013

(54) SIZING AN INFRASTRUCTURE CONFIGURATION OPTIMIZED FOR A WORKLOAD MIX

(75) Inventors: Jerome Rolia, Kanata (CA); Sebastian Gaisbauer, Röhrnbach (DE); Sebastian Phillipp Schneider, Schopfheim (DE); Nigel Edwards, Bristol (GB); Johannes Kirschnick, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1148 days.

This patent is subject to a terminal disclaimer.

(21) Appl. No.: 12/363,581

(22) Filed: Jan. 30, 2009

(65) Prior Publication Data
US 2010/0199130 A1    Aug. 5, 2010

(51) Int. Cl.
  *G06F 9/46* (2006.01)
(52) U.S. Cl.
  USPC ............................ 718/105; 718/1; 717/124
(58) Field of Classification Search
  USPC ...................... 718/1, 105; 717/124
  See application file for complete search history.

(56) References Cited

U.S. PATENT DOCUMENTS

| | | | |
|---|---|---|---|
| 5,303,166 A | 4/1994 | Amalfitano et al. | |
| 6,601,020 B1 | 7/2003 | Myers | |
| 7,769,735 B2 | 8/2010 | Wasserman et al. | |
| 2003/0018513 A1 | 1/2003 | Hoffman et al. | |
| 2003/0069779 A1 | 4/2003 | Menninger et al. | |
| 2004/0102980 A1 | 5/2004 | Reed et al. | |
| 2004/0103017 A1 | 5/2004 | Reed et al. | |
| 2005/0154628 A1 | 7/2005 | Eckart et al. | |
| 2006/0136579 A1 | 6/2006 | Linvelle et al. | |
| 2006/0161884 A1* | 7/2006 | Lubrecht et al. | 717/104 |
| 2006/0184414 A1 | 8/2006 | Pappas et al. | |
| 2006/0265470 A1* | 11/2006 | Rolia et al. | 709/217 |
| 2007/0112615 A1 | 5/2007 | Maga et al. | |

(Continued)

FOREIGN PATENT DOCUMENTS

WO    WO2007065195    6/2007

OTHER PUBLICATIONS

Sebastian Gaisbauer et al., "VATS: Virtualized-Aware Automated Test Service", Quantitative Evaluation of Systems, 2008. QEST '08. Fifth Int'l Conference, Sep. 14-17, 2008.

(Continued)

*Primary Examiner* — H S Sough
*Assistant Examiner* — Brian Wathen

(57) ABSTRACT

Sizing an infrastructure configuration optimized for a workload mix includes: a) instructing a virtualized-aware testing service (VATS) test controller to perform a test of an initial infrastructure configuration in a virtualized environment, in which the test provides at least one test result; b) determining whether the at least one test result satisfies a predetermined requirement as identified in the workload mix; c) modifying at least one parameter of the initial infrastructure configuration to create a modified infrastructure configuration in response to the at least one test result failing to satisfy the predetermined requirement; d) instructing the VATS test controller to perform another test on the modified infrastructure configuration to generate another at least one test result; e) repeating steps b)-d) until a final infrastructure configuration that causes the another at least one test result to satisfy the predetermined requirement is identified; and f) outputting the final infrastructure configuration.

15 Claims, 4 Drawing Sheets

U.S. PATENT DOCUMENTS

| | | | |
|---|---|---|---|
| 2007/0219944 | A1 | 9/2007 | Liu et al. |
| 2008/0022285 | A1* | 1/2008 | Cherkasova et al. .......... 718/104 |
| 2008/0082977 | A1* | 4/2008 | Araujo et al. ..................... 718/1 |
| 2008/0263400 | A1 | 10/2008 | Waters et al. |
| 2009/0300423 | A1* | 12/2009 | Ferris .............................. 714/38 |
| 2010/0050172 | A1* | 2/2010 | Ferris ................................ 718/1 |
| 2010/0088150 | A1* | 4/2010 | Mazhar et al. .................. 705/10 |

OTHER PUBLICATIONS

Jerry Rolia et al., "Adaptive Information Technology for Service Lifecycle Management", HP Laboratories, HPL-2008-80, Jul. 21, 2008.

Xueling Shu et al., "A Tool for Automated Performance Testing of Java3D Applications in Agile Environments", Int'l Conference on Software Eng'g Advances(ICSEA 2007).

Diwakar Krishnamurthy et al., "A Synthetic Workload Generation Technique for Stress Testing Session-Based Sys.", Int'l Conference on Software Eng'g Advances(ICSEA 2007).

Catalin Dumitrescu et al.,"DiPerF: an automated Distributed PERformance testing Framework", In Proc. 5st IEEE/ACM Internal Workshop on Grid Computing, 2004.

Andreica, et al., "Towards ServMark and Architecture for Testing Grids", Nov. 2006; CoreGRID, pp. 1-12.

Office Action dated Dec. 23, 2011, U.S. Appl. No. 12/252,395, filed Oct. 16, 2008.

Office Action dated Mar. 4, 2011, U.S. Appl. No. 12/363,558, filed Jan. 30, 2009.

Office Action dated Sep. 15, 2011, U.S. Appl. No. 12/363,558, filed Jan. 30, 2009.

Final Office Action dated Jun. 13, 2012, U.S. Appl. No. 12/363,558, filed Jan. 30, 2009.

* cited by examiner

SIZING AN INFRASTRUCTURE CONFIGURATION OPTIMIZED FOR A WORKLOAD MIX

CROSS-REFERENCE TO RELATED APPLICATIONS

The present application has the same Assignee and shares some common subject matter with U.S. patent application Ser. No. 12/363,558, filed on even date herewith, by Johannes Kirschnick et al., U.S. patent application Ser. No. 12/363,597, now U.S. Pat. No. 8,055,493, filed on even date herewith, by Jerome Rolia et al., and U.S. patent application Ser. No. 12/252,395, filed on Oct. 16, 2008, by Jerome Rolia et al., which claims the benefit of priority to U.S. Provisional Patent Application No. 61/001,483, filed on Oct. 31, 2007. The disclosures of the above-identified applications for patent are hereby incorporated by reference in their entireties.

BACKGROUND

There has been substantial growth in the purchase of information technology as a service from internal and external service providers and this trend appears to be increasing rapidly. This growth is enabled by the trend towards cloud computing, in which, services run on shared virtualized resource pools that are accessible via Intranets or the Internet. As this cloud computing paradigm matures, there is also an increasing trend for businesses to exploit the paradigm to support business critical services such as sales and delivery, and supply chain management. Those services will have performance requirements and are likely to place significant loads on cloud infrastructures.

With the increasing loads currently being placed on cloud computing infrastructures, it is becoming increasingly important to create systems configured to accurately model the workloads imposed upon the systems contained in the cloud computing infrastructures. One modeling method utilizes benchmarks to impose a synthetic workload on the cloud computing infrastructures being tested. The use of benchmarks facilitates the management of the enterprise application system in areas such as capacity planning and service level performance.

A typical business process, for instance, ordering, may in turn invoke a number of discreet business objects in order to complete the business process. In addition, a given business object may be characterized by a particular sequence of interdependent requests which are exchanged between entities in the enterprise application system. In other words, the sequence of interdependent requests should be performed correctly in order to correctly implement the business process. Thus, a benchmark for modeling the enterprise application system should accurately reflect the correct sequence and volume of interdependent requests. Otherwise, an incorrect sequence of interdependent requests may cause an error condition that does not accurately model the demands placed upon the enterprise application system.

However, conventional stress testing of enterprise application systems is based upon a small number of pre-existing benchmarks which typically utilize a small subset of business objects. As a result, it is difficult to generate a synthetic workload that accurately models the actual request patterns expected at the enterprise application system. Alternatively, creating a customized benchmark that is representative of a given enterprise is typically too time consuming and expensive for many users.

In addition, conventional stress testing procedures generally require users to have a high level of skill to be able to understand how to size and tune the enterprise application systems to accurately model the actual request patterns. Moreover, manually studying the test results and selecting which change to make to an enterprise application system, to enact that change, and to generate new measurement results and repeating that process until a suitable configuration is determined, is typically too time consuming and complicated for users to perform.

It would thus be beneficial to be able to automatically size a system without suffering from all of the drawbacks and disadvantages of conventional sizing methods.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Disclosed herein is an optimizer for sizing an infrastructure configuration optimized for a workload mix and a method for implementing the optimizer. The optimizer is configured to receive the workload mix of a particular customer, which includes one or more benchmarks that are relevant to the particular customer's requirements, which is described in the 12/252,395 application for patent. The optimizer is also configured to operate with a virtualized-aware testing service (VATS) test controller, which is described in the Ser. No. 12/363,558 application for patent, to identify results associated with various infrastructure configurations based upon the benchmark(s). In addition, the optimizer is configured to identify an infrastructure configuration that is able to perform a workload while satisfying predetermined requirements as defined in the workload mix. As discussed below, the optimizer is configured to perform a plurality of processes in an iterative manner to identify the infrastructure configuration.

The optimizer and method disclosed herein are highly customizable to customers' particular needs because the optimizer and method disclosed herein are able to identify optimized infrastructure configurations for the workload mixes of each particular customer's needs. In one regard, therefore, the optimizer and method disclosed herein enables the infrastructure configuration that remains below a predetermined threshold resource utilization requirement while performing the workloads defined in the workload mixes to be identified. Thus, by way of particular example, the predetermined threshold resource utilization requirement may be set to be a minimum resource usage requirement and the optimizer and method disclosed herein may identify the infrastructure configuration that requires the least amount of cost to perform the individual workload requirements of the customers.

Figure 1A:
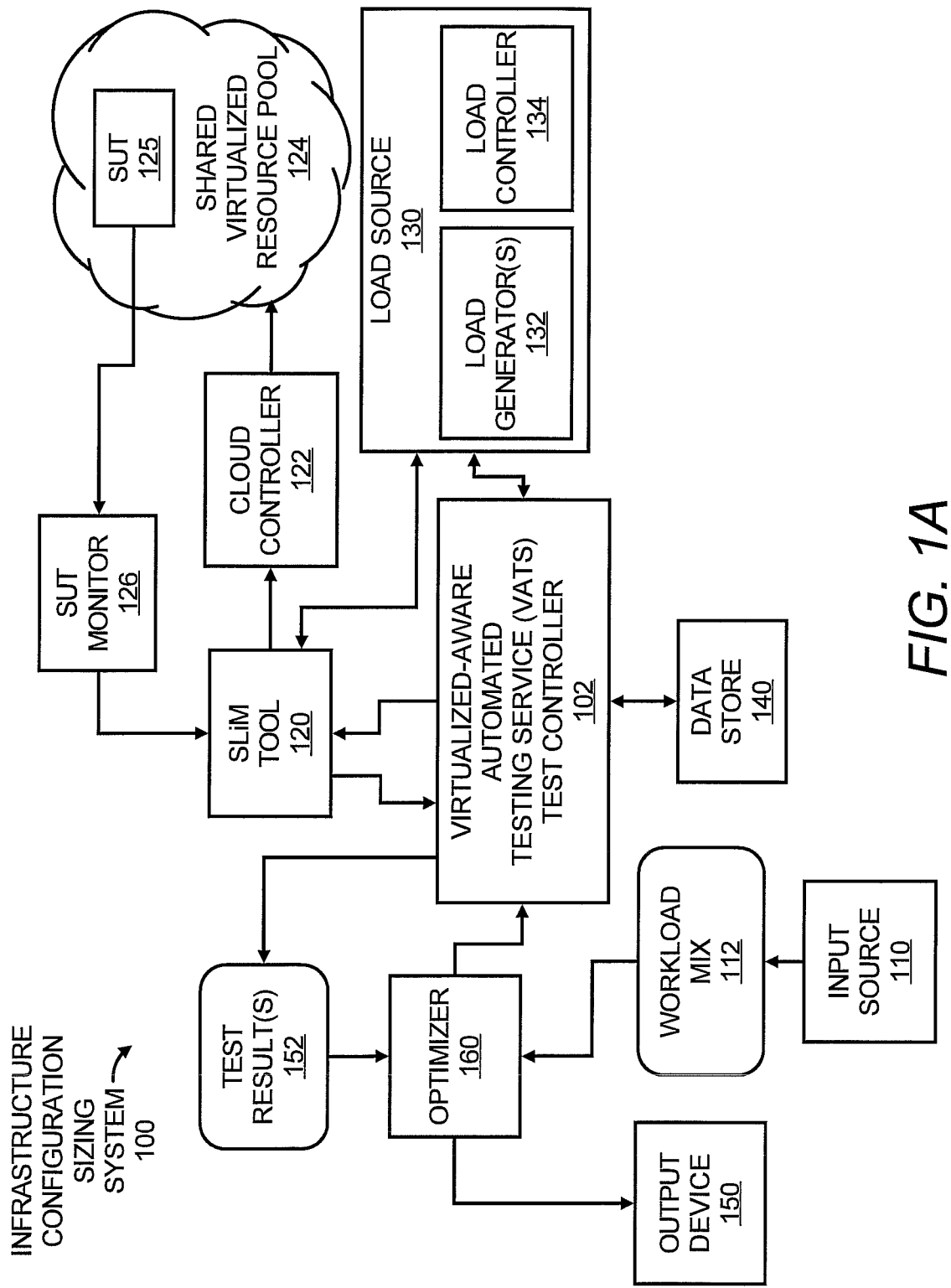
FIG. 1A illustrates a block diagram of an infrastructure configuration sizing system, according to an embodiment of the invention.

With reference first to FIG. 1A, there is shown a block diagram of an infrastructure configuration sizing system 100, according to an example. In one regard, the methods disclosed herein below may be implemented in the system 100 as discussed in greater detail herein below. It should be understood that the system 100 may include additional elements and that some of the elements described herein may be removed and/or modified without departing from a scope of the system 100.

The infrastructure configuration sizing system 100 is depicted as including a virtualized-aware automated testing service (VATS) test controller 102, an input source 110, a service lifecycle (SLiM) tool 120, cloud controller 122, a service under test (SUT) monitor 125, a load source 130, a data store 140, an output device 150, and an optimizer 160. Also shown in FIG. 1A is a shared virtualized resource pool 124, which comprises a cloud computing environment where services run on shared virtualized resource pools that are accessible via Intranets or the Internet. The use of the cloud computing environment makes it possible for the VATS test controller 102 to rapidly change resource levels and infrastructure configurations and topologies and thus rapidly vary the parameters of the infrastructure configurations to be tested.

Many of the components depicted in the infrastructure configuration sizing system 100 are described in the Ser. No. 12/363,558 application for patent. The disclosure contained in that application for patent thus provides a more detailed discussion with respect to at least some of the components depicted in the infrastructure configuration sizing system 100 and the various manners in which the components interact with each other.

Each of the VATS test controller 102 and the optimizer 160 comprises a hardware device, such as, a circuit or multiple circuits arranged on a board, or, alternatively, each of the VATS test controller 102 and the optimizer 160 comprises software comprising code stored, for instance, in a volatile or non-volatile memory, such as DRAM, EEPROM, MRAM, flash memory, floppy disk, a CD-ROM, a DVD-ROM, or other optical or magnetic media, and the like. In the second example, each of the VATS test controller 102 and the optimizer 160 comprises a software module stored in a memory. In a further alternative, each of the VATS test controller 102 and the optimizer 160 comprises a combination of hardware and software modules. In addition, although the VATS test controller 102 and the optimizer 160 have been depicted as forming separate components, the VATS test controller 102 and the optimizer 160 may be formed as a single unit, such that the resulting configuration has the same functional characteristics, as discussed in greater detail herein below.

In any regard, the VATS test controller 102 and the optimizer 160 are generally configured to perform a number of functions in the system 100. As discussed in greater detail herein below, the VATS test controller 102 comprises code or is otherwise configured to automatically execute tests, manipulate a virtualized infrastructure (for instance, a cloud computing environment) to perform the tests under multiple configurations and generate and collect performance information of resources in executing the tests under the multiple configurations.

The optimizer 160 comprises code or is otherwise configured to interact with the VATS test controller 102 to cause the VATS test controller 102 to perform the tests, and to collect test results 152 from the VATS test controller 102. In addition, the optimizer 160 comprises code or is otherwise configured to analyze the test results 152 and to modify parameters of the infrastructure configuration until an infrastructure configuration that is optimally sized for a workload mix 112 is determined. The workload mix 112 may be defined as a description of how a client is expected to use different system functions in an infrastructure configured to perform a desired workload as well as the client's expectations in performing the workload. By way of particular example, the optimizer 160 determines an infrastructure configuration that satisfies a predetermined requirement, such as, a response time goal at a required throughput level, while performing the workload, as identified in the workload mix 112, and interacts with the VATS test controller 102 to perform a test on the infrastructure configuration. In another example, the predetermined requirement comprises a requirement that the amount of resources utilized in performing the workload remain within a predetermined resource utilization requirement or that the utilized amount of resources be minimized while still meeting the other predetermined requirements of, for instance, response time and throughput goals.

Figure 1B:
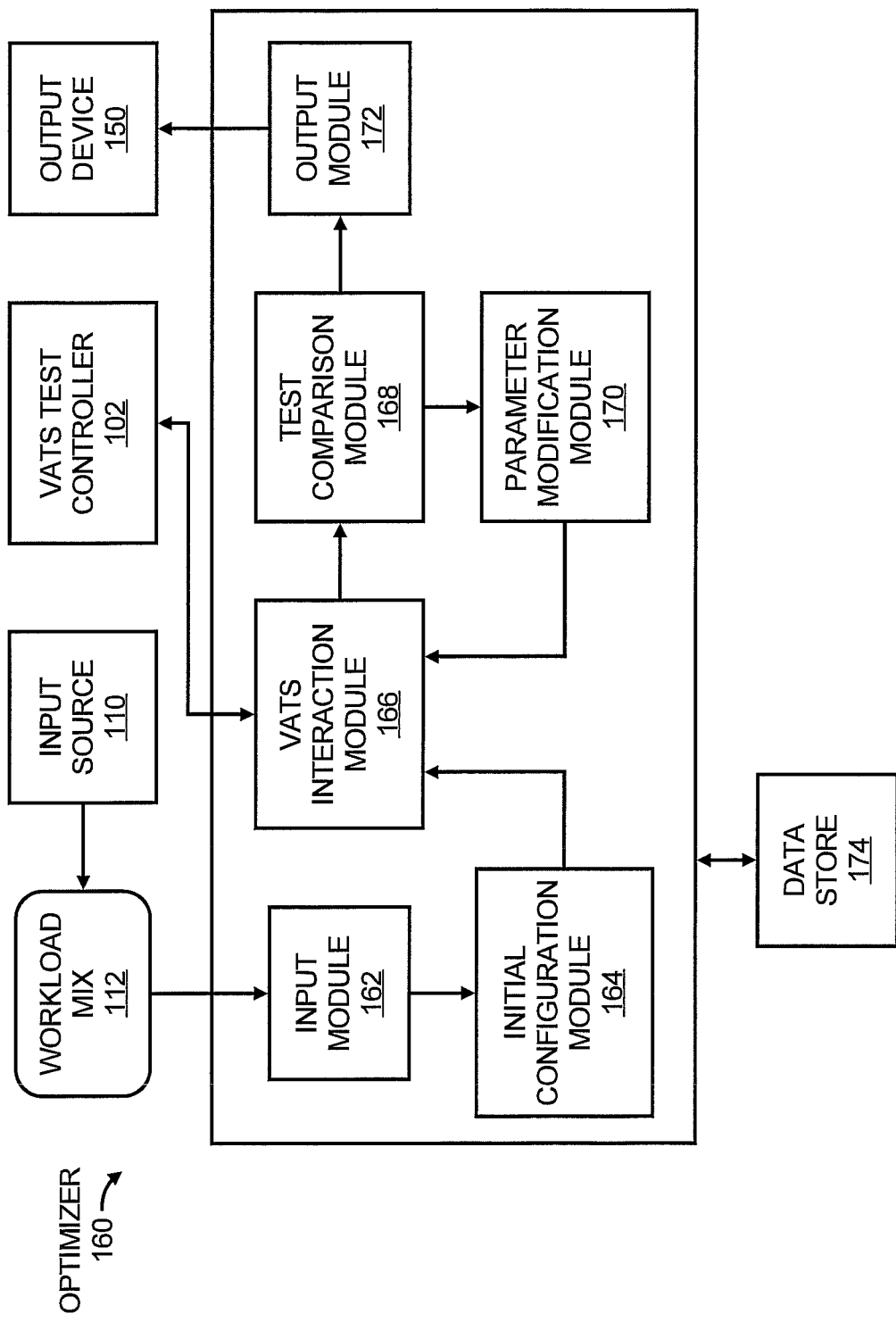
FIG. 1B illustrates a more detailed block diagram of the optimizer depicted in FIG. 1A, according to an embodiment of the invention.

A more detailed block diagram illustration of the optimizer 160 is depicted in FIG. 1B, which shows the optimizer 160 as including an input module 162, an initial configuration module 164, a VATS interaction module 166, a test comparison module 168, a parameter modification module 170, and an output module 172. The modules 162-172 may comprise software modules, hardware modules, or a combination thereof, as discussed above with respect to the optimizer 160. The optimizer 160 is also depicted as being in communication with a data store 174.

As shown in FIG. 1B, the input module 162 receives input from an input source 110. According to an example, the input source 110 comprises a computer program stored on a computer readable storage medium configured to define a workload mix 112 and to input the defined workload mix 112 into the optimizer 160. The workload mix 112 may generally be defined as being based upon a ratio of one or more predefined benchmarks, which correspond to a desired workload to be performed by resources in an infrastructure, and as including one or more predetermined requirements in performing the desired workload. The predetermined requirements include, for instance, desired throughput and response time requirements, resource utilization thresholds, minimum resource utilization requirements, etc., which may be client-defined. Thus, by way of particular example, the workload mix 112 may indicate that certain functions, such as, various business objects are to be implemented, as well as the sequence in which the certain functions are to be performed, and the VATS test controller 102 may identify an initial infrastructure configuration configured to perform those functions in the correct sequence.

The ratio of the one or more pre-defined benchmarks is described in greater detail in the Ser. No. 12/252,395 application for patent. As discussed in that application for patent, the predefined benchmark(s) are benchmark(s) configured to accurately reflect the sequences and dependencies of interdependent requests that are required to be performed correctly in order to correctly implement a client's business process.

Generally speaking, therefore, the predefined benchmark(s) define workloads, including the order in which the workloads are to be performed, that are substantially similar to the workloads that a client is likely to require from the resources in an infrastructure.

The optimizer 160 may store the workload mix 112, which includes the predefined benchmark(s) and the predetermined requirements, in the data store 174, which comprises any device capable of storage of information or any combination of devices capable of storage of information, such as, a semiconductor device, a magnetic disk memory device, nonvolatile memory devices, such as, an EEPROM or CDROM, etc. The data store 174 may also comprise a fixed or removable data storage device.

The initial configuration module 164 is configured to receive the workload mix 112 information from the input module 162 and to optionally communicate the predefined benchmark information to the VATS interaction module 166. In addition, the initial configuration module 164 is configured to identify a plurality of initial infrastructure configuration parameters to be tested by the VATS test controller 102 based upon the predefined benchmark(s). For instance, the initial configuration module 164 identifies demand estimates for the predefined benchmark(s) and, and based upon the identified demand estimates, identifies that the initial infrastructure configuration should include a particular combination of parameters or resources that is anticipated to meet the demand estimates, such as a particular number or kind of application servers, particular memory sizes of the application servers, concurrency parameters that govern each application's concurrency management mechanisms (e.g., threads), a particular number of network switches, a particular allocation of network bandwidth, etc.

Moreover, the initial configuration module 164 is configured to communicate the initial infrastructure configuration parameters to the VATS test controller 102 through the VATS interaction module 166 and to instruct the VATS test controller 102. In this regard, the VATS interaction module 166 may comprise a hardware and/or software interface that enables communications between the optimizer 160 and the VATS test controller 102.

In response to receipt of the instructions from the optimizer 160, the VATS test controller 102 is configured to initiate performance of a test on the initial infrastructure configuration in a virtualized environment. In this regard, the VATS test controller 102 may employ the initial infrastructure configuration as the test description discussed in the Ser. No. 12/363,558 application for patent. In addition, although the initial configuration module 164 has been described herein as identifying the initial infrastructure configuration parameters, in other embodiments, the VATS test controller 102 may identify the initial infrastructure configuration parameters without departing from a scope of the optimizer 160.

The VATS test controller 102 is thus configured to be instantiated and deployed to perform a test on the initial infrastructure configuration. Various manners in which the VATS test controller 102 interacts with the SLiM tool 120 and the load source 130, which includes one or more load generators 132 and a load controller 134, are described in the Ser. No. 12/363,558 application for patent. That disclosure is incorporated by reference in its entirety herein. Through performance of the test on the initial infrastructure configuration of resources contained in the shared virtualized resource pool 124, as discussed in that application for patent, the VATS test controller 102 generates one or more test results 152. The one or more test results 152 may include at least one of, for instance, a number of users supported, throughputs, response times, resource utilization levels, etc., associated with the initial infrastructure configuration.

The VATS test controller 102 communicates the test result(s) 152 to the optimizer 160. More particularly, for instance, the VATS test controller 102 communicates the test result(s) 152 to the optimizer 160 through the VATS interaction module 166. In addition, the test comparison module 168 compares the test result(s) 152 with one or more predetermined requirements, which may have been defined in the workload mix 112 received from the input source 110. The predetermined requirement(s) may comprise, for instance, a throughput requirement, a response time requirement, a number of users supported requirement, etc., the workload to be performed, a minimum resource utilization level requirement, a threshold resource utilization level requirement, etc. By way of particular example, the test comparison module 168 is configured to determine whether the throughput associated with the initial infrastructure configuration is able to perform the workload while satisfying a predetermined throughput requirement as set forth in the workload mix 112 received from the input source 110.

In the event that the test comparison module 168 determines that the test result(s) 152 meets the predetermined requirement(s), the test comparison module 168 may output the initial infrastructure configuration as a suitable configuration of an infrastructure that meets the workload mix 112. In the event that the test comparison module 168 determines that one or more of the test results 152 fail to meet one or more of the predetermined requirements, the test comparison module 168 may communicate with the parameter modification module 170 to modify one or more parameters of the initial infrastructure configuration. Alternatively, the test comparison module 168 may communicate with the parameter modification module 170 to modify the one or more parameters even in instances where the test result(s) 152 meets the predetermined requirement(s) to, for instance, identify a more efficient infrastructure configuration that meets the predetermined requirement(s).

In either event, the parameter modification module 170 is configured to determine which of the parameters of the initial infrastructure configuration, which include the number or kind of application servers employed, concurrency parameters that govern each application server's concurrency management mechanisms (e.g., threads), network bandwidth, CPU speed, cache size, memory size, etc., to modify. In one example, the parameter modification module 170 is configured to select one or more of the parameters to modify based upon a historical knowledge of how the parameters affect the infrastructure configuration. For instance, the number of application servers may be known from prior iterations of the VATS to have the greatest impact on the results of the infrastructure configuration, while the memory sizes are known to have a second highest impact. In another example, the parameter modification module 170 is configured to modify some or all of the parameters or to randomly select one or more of the parameters to modify.

In any regard, the parameter modification module 170 is configured to communicate the modified infrastructure configuration having the modified one or more parameters to the VATS test controller 102 via the VATS interaction module 166. In response, the VATS test controller 102 is configured to perform a test on the modified infrastructure configuration to generate another test result(s) 152. In addition, the another test result(s) 152 are received through the VATS interaction module 166 and communicated to the test comparison module 168, which again compares the another test result(s) 152 to the predetermined requirement(s) to determine whether the modified infrastructure configuration is associated with test result(s) 152 that satisfies the predetermined requirement(s).

In one embodiment, the VATS interaction module 166, the test comparison module 168, and the parameter modification module 170 are configured to repeat the operations discussed above until the test comparison module 168 identifies a final infrastructure configuration that satisfies the predetermined requirement(s). In addition, the test comparison module 168 is configured to output the infrastructure configuration that satisfies the predetermined requirement(s) to an output device 150 through the output module 172. The output device 150 may comprise, for instance, a network interface, a display monitor, a printer, etc., that enables the optimizer 160 to communicate the test results 152 to one or more users.

In another embodiment, the predetermined requirement(s) further comprises a requirement that the amount of resources utilized in performing the workload remain below a predetermined threshold resource utilization level or that the utilized amount of resources be minimized. In this embodiment, the parameter modification module 170 is configured to modify at least one of the parameters of the infrastructure configuration to reduce at least one resource utilization of the infrastructure configuration to meet the predetermined requirement(s), while still meeting the other predetermined requirements of performing the workload and meeting the other requirements, such as, throughput, response time, etc. In one example, the parameter modification module 170 is configured to modify those parameters that are known to have a greater impact on the overall resource utilization, such as, power consumption, network bandwidth utilization, cooling power consumption, carbon emissions, etc., before modifying other parameters known to have a lower impact on the overall resource utilization.

In another example, the parameter modification module 170 is configured to randomly modify the parameters during a number of iterations to determine which infrastructure configuration is associated with resource utilization levels that remain below the predetermined threshold resource utilization level or with the lowest resource utilization levels. As discussed in the Ser. No. 12/363,558 application for patent, the VATS test controller 102 may cause multiple tests to be run in parallel to thus reduce the amount of time required in rigorously identifying the infrastructure configuration that is associated with the lowest resource utilization levels.

An example of a method of implementing the infrastructure configuration sizing system 100, and more particularly, the optimizer 160, to size an infrastructure configuration optimized for a workload mix 112, will now be described with respect to the following flow diagram of the method 200 depicted in FIG. 2. It should be apparent to those of ordinary skill in the art that the method 200 represents a generalized illustration and that other steps may be added or existing steps may be removed, modified or rearranged without departing from a scope of the method 200.

The description of the method 200 is made with reference to the infrastructure configuration sizing system 100 illustrated in FIG. 1A and the optimizer 160 illustrated in FIG. 1B, and thus makes reference to the elements cited therein. It should, however, be understood that the method 200 is not limited to the elements set forth in the infrastructure configuration sizing system 100 and the optimizer 160. Instead, it should be understood that the method 200 may be practiced by a system having a different configuration than that set forth in the infrastructure configuration sizing system 100 and the optimizer 160.

At step 202, the input module 162 receives a workload mix 112 that is based upon a ratio of one or more predefined benchmarks from the input source 110. At step 204, the initial configuration module 164 optionally communicates the predefined benchmark information to the VATS test controller 102 via the VATS interaction module 166. Step 204 is considered optional because the initial configuration module 164 may not communicate the predefined benchmark information to the VATS test controller 102 in instances where the initial configuration module 164 identifies the initial infrastructure configuration.

At step 206, an initial infrastructure configuration is identified and the VATS interaction module 166 instructs the VATS test controller 102 to perform a test on the initial infrastructure configuration in the virtualized environment to generate one or more test results 152, as described in the Ser. No. 12/363,558 application for patent. According to a first example, the initial configuration module 164 is configured to identify the initial infrastructure configuration from the predefined benchmark information, as discussed in greater detail herein above. In another example, the VATS test controller 102 is configured to identify the initial infrastructure configuration from the predefined benchmark information, as discussed in greater detail herein above.

At step 208, the optimizer 160 receives the test result(s) 152 from the VATS test controller 102. In addition, at step 210, the test comparison module 168 compares the test result(s) 152 with one or more predetermined requirements. More particularly, at step 210, the test comparison module 168 determines whether the test result(s) 152 satisfies the predetermined requirement(s), for instance, as set forth in the workload mix 112 received at step 202. By way of particular example, the predetermined requirement(s) comprises a response time requirement and the test comparison module 168 determines whether the response time as identified in the test result(s) 152 satisfies the response time requirement. As another example, the predetermined requirement(s) comprises a minimum resource utilization level requirement and the test comparison module 168 determines whether the resource utilization level of the initial infrastructure configuration satisfies the minimum resource utilization level requirement. In this example, a number of iterations of the following steps may be required prior to a determination of whether the minimum resource utilization level requirement has been satisfied may be made.

In the event that the test result(s) 152 satisfies the predetermined requirement(s) at step 210, the test comparison module 168 outputs the initial infrastructure configuration as a suitable configuration of an infrastructure that meets the workload mix 112, as indicated at step 212. As discussed above, the test comparison module 168 may output this information to an output device 150 through the output module 172.

If, however, one or more of the test results 152 fails to satisfy one or more of the predetermined requirements at step 210, the test comparison module 168 communicates with the parameter modification module 170 to modify one or more of the infrastructure configuration parameters, and the parameter modification module 170 modifies one or more of the parameters, as indicated at step 214. By way of example, if the predetermined requirement comprises a minimum resource utilization level requirement, the test comparison module 168 communicates with the parameter modification module 170 to modify one or more of the infrastructure configuration parameters in the event that the resource utilization level associated with the initial infrastructure configuration exceed the minimum resource utilization level requirement.

In addition, the parameter modification module 170 is configured to select the one or more of the parameters to modify according to any of a number of various manners as discussed above. In another example, the parameter modification module 170 modifies some or all of the parameters by setting some or all of the parameters to their respective maximum values and by reducing each of the plurality of parameters, in turn, during subsequent iterations of steps 208-218, until a final infrastructure configuration that causes the another at least one test result to satisfy the predetermined requirement and utilizes a minimized amount of resources is identified.

In a further example, the parameter modification module 170 modifies a plurality of parameters by setting the plurality of parameters to have initial values and by variously increasing and decreasing the plurality of parameters to obtain a plurality of test results corresponding to the various modifications of the plurality of parameters to identify a plurality of interactions. In this example, the parameter modification module 170 develops a model of the interactions and selects the one or more of the plurality of parameters to modify prior to step 214 through implementation of the model of the interactions.

At step 216, the parameter modification module 170 communicates the modified infrastructure configuration having the modified one or more parameters to the VATS test controller 102 via the VATS interaction module 166. In addition, at step 218, the VATS interaction module 166 instructs the VATS test controller 102 to perform a test on the modified infrastructure configuration, for instance as discussed in the Ser. No. 12/363,558 application for patent, to generate another one or more test results 152.

Steps 208-218 are repeated until a final infrastructure configuration that results in the test result(s) 152 satisfying the predetermined requirement(s) is identified at step 210. Steps 208-218 may be performed for a plurality of modified infrastructure configurations in parallel or in series with respect to each other. In addition, the final infrastructure configuration may be outputted as indicated at step 212, in which the final infrastructure configuration comprises an infrastructure configuration that is optimally sized for the workload mix 112. In addition, or alternatively, the method 200 may be terminated for additional reasons. For instance, the method 200 may be terminated after steps 208-218 have been repeated for a predetermined number of iterations without resulting in an infrastructure configuration that satisfies the predetermined requirement(s). In this example, the predetermined number of iterations may be based upon a predefined quantity of resources or costs have been expended or after a predefined number of iterations are performed that indicates that an infrastructure configuration that satisfies the predetermined requirement(s) is unlikely to be identified.

Through implementation of the method 200, an infrastructure configuration composed of application servers, memories, network switches, bandwidth allocations, etc., configured to perform a workload configured to satisfy one or more predefined benchmarks while satisfying a predetermined requirement may automatically be identified. In addition, the infrastructure configuration may be optimally sized for the workload by minimizing the resource utilization level of the infrastructure configuration, while being configured to perform the workload.

The operations set forth in the method 200 may be contained as utilities, programs, or subprograms, in any desired computer accessible medium. In addition, the method 200 may be embodied by computer programs, which may exist in a variety of forms both active and inactive. For example, they may exist as software program(s) comprised of program instructions in source code, object code, executable code or other formats. Any of the above may be embodied on a computer readable storage medium.

Exemplary computer readable storage medium include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 2:
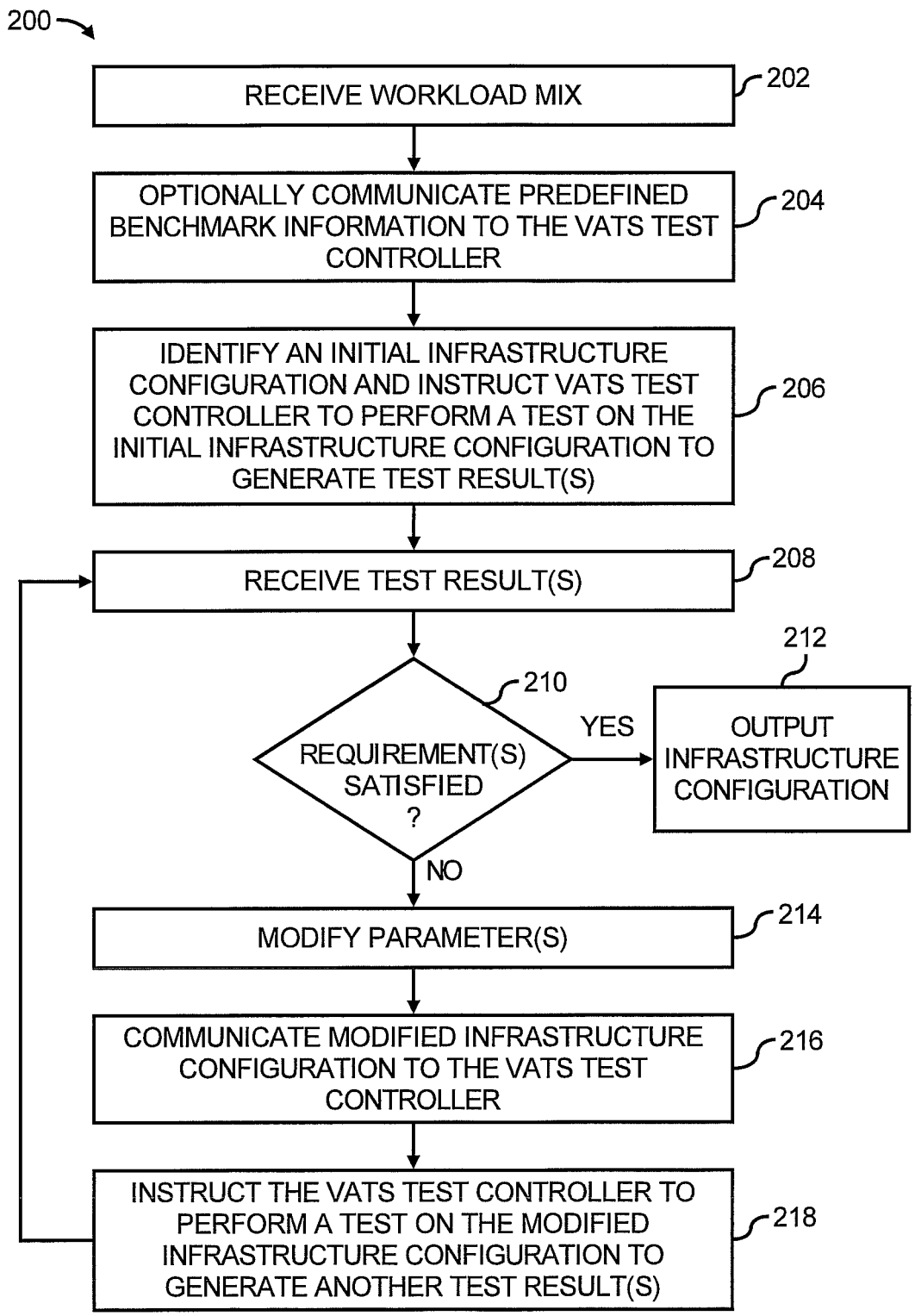
FIG. 2 illustrates a flow diagram of a method of implementing the infrastructure configuration sizing system, and more particularly, the optimizer depicted in FIGS. 1A and 1B, to size an infrastructure configuration optimized for a workload mix, according to an embodiment of the invention.
Figure 3:
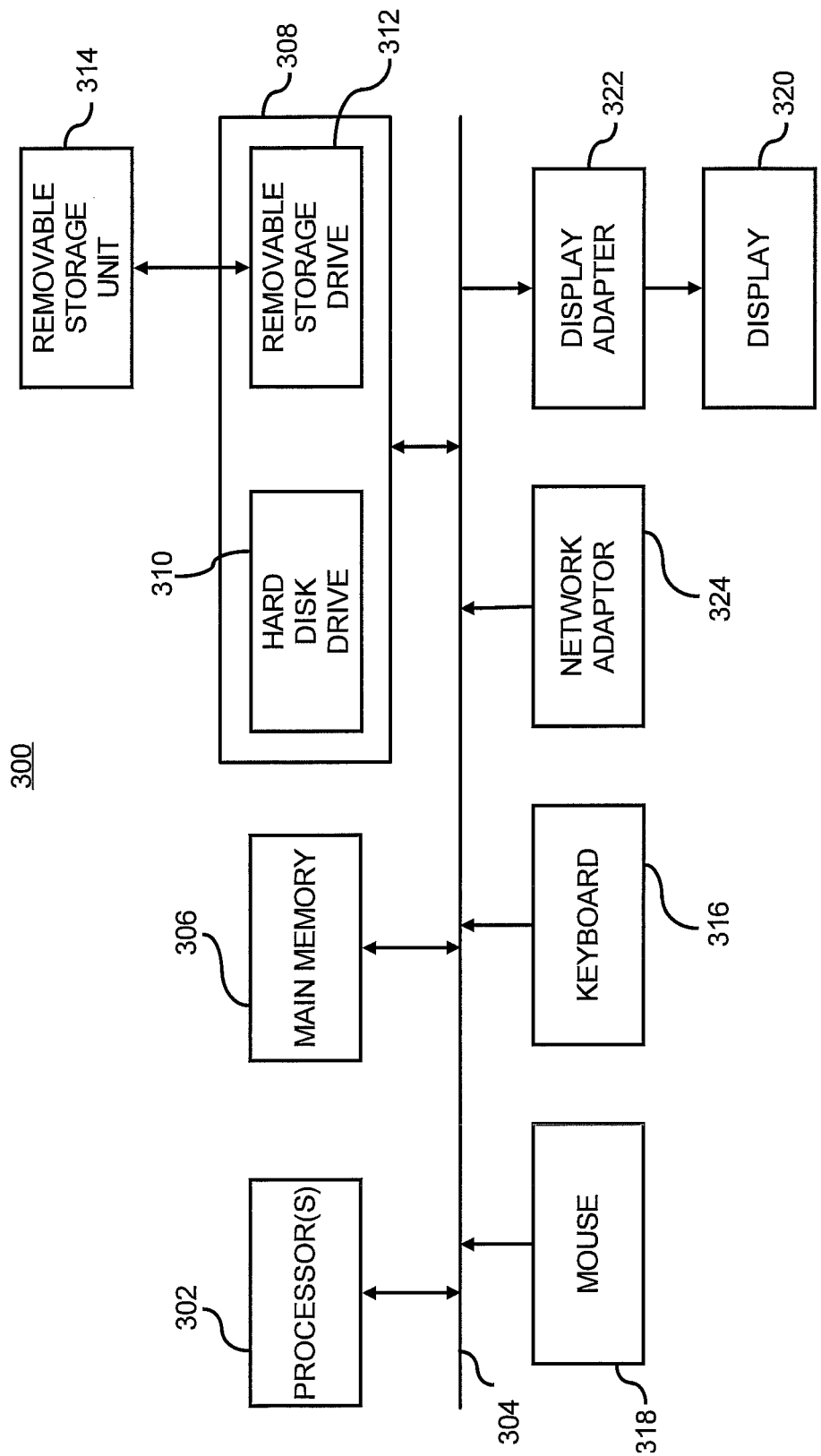
FIG. 3 illustrates a block diagram of a computing apparatus configured to implement the method depicted in FIG. 2 according to an embodiment of the invention.

FIG. 3 illustrates a block diagram of a computing apparatus 300 configured to implement or execute some or all of the steps defined in the method 200 depicted in FIG. 2, according to an example. In this respect, the computing apparatus 300 may be used as a platform for executing one or more of the functions described hereinabove with respect to the optimizer 160 depicted in FIGS. 1A and 1B.

The computing apparatus 300 includes a processor 302 that may implement or execute some or all of the steps described in the method 200. Commands and data from the processor 302 are communicated over a communication bus 304. The computing apparatus 300 also includes a main memory 306, such as a random access memory (RAM), where the program code for the processor 302, may be executed during runtime, and a secondary memory 308. The secondary memory 308 includes, for example, one or more hard disk drives 310 and/or a removable storage drive 312, representing a floppy diskette drive, a magnetic tape drive, a compact disk drive, etc., where a copy of the program code for the method 200 may be stored.

The removable storage drive 312 reads from and/or writes to a removable storage unit 314 in a well-known manner. User input and output devices may include a keyboard 316, a mouse 318, and a display 320. A display adaptor 322 may interface with the communication bus 304 and the display 320 and may receive display data from the processor 302 and convert the display data into display commands for the display 320. In addition, the processor(s) 302 may communicate over a network, for instance, the Internet, LAN, etc., through a network adaptor 324.

It will be apparent to one of ordinary skill in the art that other known electronic components may be added or substituted in the computing apparatus 300. It should also be apparent that one or more of the components depicted in FIG. 3 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A computer-implemented method for sizing an infrastructure configuration optimized for a workload mix, said method comprising:
   a) instructing a virtualized-aware testing service (VATS) test controller to perform a test of an initial infrastructure configuration in a virtualized environment, wherein the test generates at least one test result;
   b) determining whether the at least one test result satisfies a predetermined requirement as identified in the workload mix;

c) modifying at least one of a plurality of parameters of the initial infrastructure configuration to create a modified infrastructure configuration in response to the at least one test result failing to satisfy the predetermined requirement;

d) instructing the VATS test controller to perform another test on the modified infrastructure configuration to identify another at least one test result;

e) determining whether the another at least one test result satisfies the predetermined requirement as identified in the workload mix;

f) determining a final infrastructure configuration that causes the another at least one test result to satisfy the predetermined requirement is identified; and g) outputting the final infrastructure configuration, wherein the final infrastructure configuration is optimally sized for the workload mix.

2. The computer-implemented method according to claim 1, further comprising:

receiving the workload mix prior to step a), wherein the workload mix is based upon a ratio of one or more predefined benchmarks that include an order in which a plurality of workloads are to be performed; and wherein step a) further comprises identifying the initial infrastructure configuration from the ratio of the one or more of predefined benchmarks.

3. The computer-implemented method according to claim 1, wherein the predetermined requirement comprises at least one of a throughput requirement, a response time requirement, a number of users supported requirement, response time requirements as set forth in the workload mix, a predetermined resource utilization level threshold, and a minimum resource utilization requirement.

4. The computer-implemented method according to claim 1, further comprising:

h) modifying at least one parameter of the final infrastructure configuration, wherein the modification is configured to reduce at least one resource utilization of the final infrastructure configuration;

i) instructing the VATS test controller to perform another test on the modified final infrastructure configuration to generate another at least one test result; and j) repeating steps h) and i) until an optimized final infrastructure configuration that satisfies the predetermined requirement is identified, wherein the predetermined requirement comprises at least one of a predetermined resource utilization level threshold and a minimized level of resource utilization.

5. The computer-implemented method according to claim 1, wherein the at least one parameter comprises at least one of a number of application servers employed, network bandwidth, CPU speed, cache size, and memory size wherein step c) further comprises modifying at least one of the network bandwidth, CPU speed, cache size, and memory size.

6. The computer-implemented method according to claim 1, further comprising:

selecting one or more of the plurality of parameters of the initial infrastructure configuration to modify prior to performing step c), wherein the selection of the one or more of the plurality of parameters to modify is based upon a historical knowledge of how the plurality of parameters affect the infrastructure configuration.

7. The computer-implemented method according to claim 1, wherein steps c)-f) further comprise setting the plurality of parameters of the infrastructure configuration to their respective maximum values and reducing each of the plurality of parameters, in turn, during subsequent iterations until the final infrastructure configuration that causes the another at least one test result to satisfy the predetermined requirement and utilizes a minimized amount of resources is identified.

8. The computer-implemented method according to claim 1, wherein steps c)-f) further comprise setting the plurality of parameters to have initial values and variously increasing and decreasing the plurality of parameters to obtain a plurality of test results corresponding to the various modifications of the plurality of parameters to identify a plurality of interactions, said method further comprising:

h) developing a model of the interactions; and i) selecting which of the plurality of parameters of the initial infrastructure configuration to modify prior to performing step c) through implementation of the model of the interactions.

9. The computer-implemented method according to claim 1, wherein step f) further comprises determining a plurality of modified infrastructure configurations in parallel with respect to each other.

10. A computer-readable storage medium on which is embedded computer code, said computer code defining an infrastructure configuration optimizer for a workload mix, said computer code comprising:

a virtualized-aware testing service (VATS) interaction module for interacting with a VATS test controller, wherein the interaction module is configured to cause the VATS test controller to perform a test of an initial infrastructure configuration in a virtualized environment and to receive at least one test result from the VATS test controller;

a test comparison module configured to determine whether the at least one test result satisfies a predetermined requirement as identified in the workload mix;

a parameter modification module configured to modify at least one of a plurality of parameters of the initial infrastructure configuration to create a modified infrastructure configuration, wherein the VATS interaction module is configured to interact with the VATS test controller to cause another test to be performed on the modified infrastructure configuration to generate another at least one test result, and wherein the test comparison module, the parameter modification module, and the VATS interaction module are configured to iteratively operate until a final infrastructure configuration that causes the another at least one test result to satisfy the predetermined requirement is identified.

11. The computer-readable storage medium according to claim 10, further comprising code for:

an output module configured to output the final infrastructure configuration; and an initial configuration module configured to receive the workload mix, wherein the workload mix is based upon a ratio of one or more predefined benchmarks that include an order in which workloads are to be performed and to identify the initial infrastructure configuration from the ratio of the one or more predefined benchmarks.

12. The computer-readable storage medium according to claim 10, wherein the predetermined requirement comprises at least one of a throughput requirement, a response time requirement, a number of users supported requirement, response time requirements as set forth in the workload mix, a predetermined resource utilization level threshold, and a minimum resource utilization requirement.

13. The computer-readable storage medium according to claim 10, wherein the at least one of the plurality of parameters comprises at least one of network bandwidth, CPU speed, cache size, and memory size.

14. The computer-readable storage medium according to claim 10, wherein the parameter modification module is further configured to modify at least one parameter of the final infrastructure configuration, wherein the modification is configured to reduce at least one resource utilization of the final infrastructure configuration and to instruct the VATS test controller to perform another test on the modified final infrastructure configuration to generate another at least one test result, and to continue to operate until an optimized final infrastructure configuration that satisfies the predetermined requirement is identified, wherein the predetermined requirement comprises at least one of a predetermined resource utilization level threshold and a minimized level of resource utilization.

15. A computer readable storage medium on which is embedded one or more computer programs, said one or more computer programs implementing a method for sizing an infrastructure configuration optimized for a workload mix, said one or more computer programs comprising a set of instructions to:

a) instruct a virtualized-aware testing service (VATS) test controller to perform a test of an initial infrastructure configuration in a virtualized environment, wherein the test generates at least one test result;
b) determine whether the at least one test result satisfies a predetermined requirement as identified in the workload mix;
c) modify at least one of a plurality of parameters of the initial infrastructure configuration to create a modified infrastructure configuration in response to the at least one test result failing to satisfy the predetermined requirement;
d) instruct the VATS test controller to perform another test on the modified infrastructure configuration to generate another at least one test result;
e) determine whether the another at least one test result satisfies the predetermined requirement as identified in the workload mix; and
f) determine a final infrastructure configuration that causes the another at least one test result to satisfy the predetermined requirement is identified.

* * * * *